Figure 1:
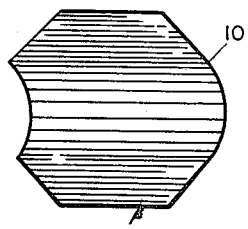

June 7, 1960     E. L. RAMER     2,939,391
PROTECTION OF ELECTRIC BLASTING CAPS
Filed Oct. 17, 1956

EDWARD L. RAMER
INVENTOR.

BY    *Ernest G. Peterson*

AGENT.

United States Patent Office 2,939,391
Patented June 7, 1960

2,939,391

PROTECTION OF ELECTRIC BLASTING CAPS

Edward L. Ramer, Hockessin, Del., assignor to Hercules Powder Company, Wilmington, Del., a corporation of Delaware Filed Oct. 17, 1956, Ser. No. 616,446

11 Claims. (Cl. 102—28)

This invention relates to shunts for short circuiting electric lead wires. In one aspect this invention relates to shunts for avoiding accidental firing of electric blasting caps through contact of the lead wires with a source of electric current. In another aspect this invention relates to a device for shunting flow of electric current through lead wires, which contains a spring assembly for biasing the wires in conductive contact with each other. In another aspect this invention relates to a method for assembling a pair of lead wires with a shunt device for avoiding flow of electric current through the lead wires particularly when connected in an electric blasting cap assembly. In still another aspect this invention relates to an improved method for handling electric blasting caps.

Various means have been set forth in the art for shunting an electric circuit, i.e., for joining a conductor with two points in a circuit to form a parallel or divided circuit to terminate flow of current, or regulate it, throughout the circuit. In electric blasting cap manufacture and utilization it is customary to avoid accidental ignition of the cap by short circuiting the lead wires until just before ignition is to take place. Such a device involves the use of a bridging member for uninsulated sections of the lead wires, generally uninsulated ends, adapted to be readily removed in the field at a time just before firing is to take place. Such short circuiting devices or shunts employed heretofore have consisted, for example, of conductors soldered across the wires or metallic plates having their ends turned inwardly about the wires and clamped thereon, the metal being soft and thin so that disengagement can be effected at will. Other devices in the art include clip shunts made of soft metal plate such as of aluminum, lead, tin and the like, and snap shunts made of various materials. Many of the shunts of the prior art are either removed from contact of the wire, with difficulty, or are too easily loosened from their contact with the wire with consequent unsatisfactory contact and unreliable performance.

This invention is concerned with a shunt device by which a plurality of electric lead wires are biased in constant conductive contact and which can be easily removed from the wires by a simple pull by hand.

An object of this invention is to provide a new shunt device. Another object is to provide new lead wire assemblies for electric blasting caps including a shunt as an element thereof containing spring means for biasing the said lead wires in conductive contact with each other. Another object is to provide shunt devices for lead wires of electric blasting cap assemblies. Another object is to provide a method for assembling a lead wire assembly including a shunt as an element thereof. Another object is to provide for utilization of a spring device to bias a pair of wires into conductive contact with each other. Another object is to provide for improved safety in handling electric blasting cap assemblies. Other objects and aspects will be apparent from the accompanying disclosure and the appended claims.

In accordance with this invention a shunt device is provided which comprises a first member, a second member of spring temper supported in surface contact with said first member and adapted to bias a pair of wires in contact with both said members by spring tension of said second member, when said wires are intermediate said first and second members, and at least one of said members being an electrical conductor. The said members are preferably both metal and the said first member is preferably of soft temper. Further, in accordance with this invention a shunt device is provided which comprises an incompletely closed metal sleeve and a metal of spring temper in said sleeve positioned so as to be capable of imposing spring tension toward the open side of said sleeve. Still in accordance with this invention a method for assembling a lead wire assembly is provided which comprises fastening an uninsulated portion of each of a pair of wires intermediate a first metal member and a second metal member and in contact with said member, the said second metal member being of spring temper, and positioning said second member in spring tension so as to bias said wires in contact with said first and second members. Further in accordance with this invention an improvement in safety of handling electric blasting cap assemblies is provided which comprises maintaining a bared portion of each of the insulated lead wires in contact with a supporting member, biased in said contact by tension of a member of spring temper fastened in surface contact with said supporting member, and at least one of said members being an electrical conductor.

Figure 2:
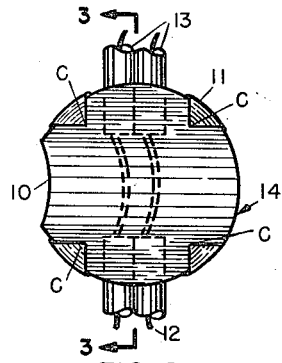
Figure 3:
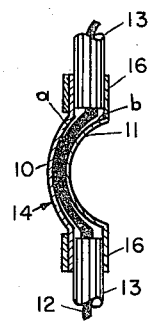
Figure 4:
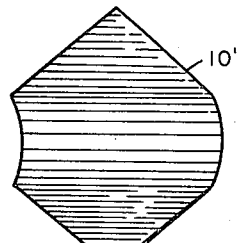
Figure 5:
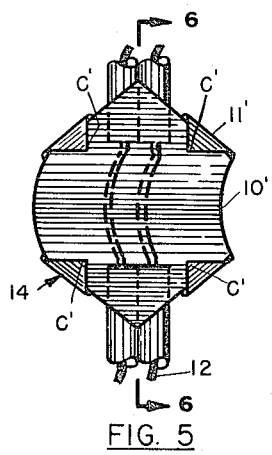
Figure 6:
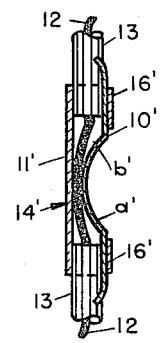
Figure 7:
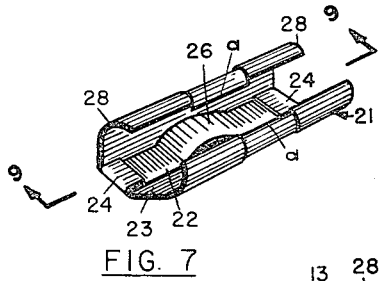
Figure 8:
Figure 9:
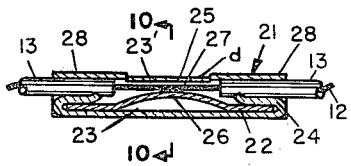
Figure 10:
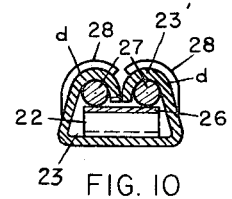

The invention is further illustrated with reference to the drawings of which Fig. 1 is a plan view of a spring metal member of one embodiment of the shunt device of this invention; Fig. 2 is a rear view in perspective of the said embodiment showing the spring element of Fig. 1 on the backside; Fig. 3 is a view along the line 3—3 of Fig. 2 particularly showing the biasing effect of the spring member of Fig. 2 on bare wire sections in the shunt to hold them against a soft tempered metal member positioned on the front side; Fig. 4 is a plan view of a spring metal member of another embodiment of the shunt device of this invention; Fig. 5 is a front view in perspective of the last said embodiment showing the spring element of Fig. 4 on the front side; Fig. 6 is a view along the line 6—6 of Fig. 5 particularly showing the biasing effect of the spring member of Fig. 5 on the bare wire sections in the shunt to hold them against a soft tempered member on the backside; Fig. 7 is a view in perspective of a now preferred embodiment of the shunt of this invention and shows a partially closed sleeve preferably of soft tempered metal in which is disposed opposite the open side, a spring element for biasing bared wires in contact with the soft metal sleeve when the sleeve is closed around the wires such as shown by way of Fig. 10; Fig. 8 is a perspective view of the spring element of the shunt of Fig. 7; Fig. 9 is a view along the line 9—9 of Fig. 7 showing more clearly the biasing effect of the spring element of Fig. 7 on the wire sections therein as also shown in Fig. 10, the latter a view along the line 10—10 of Fig. 9.

With reference to Figs. 1–3, spring member 10 is a flat metal member of sheet thickness say from about 0.005 to 0.015 inch and is of spring temper, Phosphor bronze being now preferred. Metal sheet 10 can be shaped as shown and superposed on metal member 11 of soft temper and of relatively heavy gauge, say of thickness of from 0.010 to 0.030 inch, aluminum being now preferred. Spring member 10 is fastened in contact under spring tension against member 11 such as by folding a plurality of edges c of member 11 over member 10 as shown in Fig. 2.

Bared wires 12, intermediate members 10 and 11, are biased in contact with soft metal member 11 by spring action of element 10, and insulated outside the zone of the biased contact by insulation 13. Preferably member 10 is slightly deformed along its lines of contact with bare wires 12 to form a channel with member 11 to support wires 12 in tight fit in shunt 14. If desired, member 11 can be slightly deformed cooperatively with member 10 to support wires 12. Ends of members 10 and 11 are further deformed to grip wires 12 as a sleeve around insulation 13 above and below the shunt action as shown at 16, to give further support of wires 12 in contact with shunt 14 and to prevent movement of shunt 14 along wires 12.

Sheet 11 of Fig. 2 is preferably shaped the same as member 10 so that the two members are supported in surface contact to provide a shunt of optimum strength not only with reference to maintaining the shunt action but also with reference to providing further resistance to movement from the shunting position during handling prior to firing in the field.

Spring tension of member 10 against the bared leg wires is preferably effected by placing a flat member 10 over a flat member 11 with bared wire portions intermediate the two members, followed by pressing the three elements in a single operation into the form shown with reference to Figs. 2 and 3.

As shown, the "front" portion of shunt 14 is pressed out to form a concave inner wall of face a against a corresponding shaped convex shaped surface b of member 11. The spring member 10 is supported in a biasing action against wires 12 to support them against face b.

With reference to Figs. 4–6, element 10' is a flat metal member of sheet thickness such as that of element 10, and is of spring tension and adapted to be supported in contact with element 11' under spring tension to bias bare wires 12 in contact with element 11' when placed intermediate those elements 10' and 11'. As shown in Fig. 5 the spring metal is disposed on the front of shunt 14', the concave outer shaped surface a' being that of element 10'.

Element 11', forming the back of shunt 14', is secured in contact with element 10' by its edges c' folded on to element 10'. Soft metal 11 in accordance with this embodiment forms the back of the shunt and is deformed to form a channel with element 10 to provide a tight fit for bare wires 12, and to form a sleeve with metal 10' at ends 16' around insulated portion 13 of wires 12 to give further support of wires in contact with shunt 14' and to prevent movement of shunt 14' along wires 12. As in Fig. 3, the wires 12 disposed intermediate elements 10' and 11' are insulated except for those bared portions in shunted contact in shunt 14'.

In accordance with a preferred procedure, shunt element 10' is deformed to provide concave face a' and corresponding convex side b', and then fastened in close contact with element 11' and wires 12 with its convex shaped surface b' toward element 11'.

As shown in Fig. 5, element 11' is partially faced to conform in size and shape with element 10'. However, that central and elongated portion of element 11' to be contacted with bare wire 12 is a flat surface against which bare wires 12 are biased by spring member 10'.

With reference to Fig. 7, partially closed sleeve 21 is a metal of soft temper, aluminum now preferred, and contains along its inner wall opposite its open side a metal strip 22 of spring temper, Phosphor bronze now preferred. Strip 22 is fastened to the inner wall 23 of sleeve 21 by any suitable means such as by end portions 24 of sleeve 21 rolled back over each end of strip 22 in a sufficiently tight fit to prevent substantial movement of strip 22. A central portion 26 of strip 22 opposite the open side of sleeve 21 is raised toward the said open side and provides spring tension for biasing bared portions of wires 12 against the inner wall of soft metal sleeve 21 formed opposite wall 23 by closing sleeve 21, as shown by Fig. 9.

Fig. 8 is further illustrative of the spring strip 22 of Fig. 7. Other suitable spring assemblies can be employed. Thus a strip 22, if desired, can be a bow with its convex side closest to the open side of sleeve 21. In another form the element 22 can be a thin strip of spring temper, or not, as desired, with a raised portion 26 below which is disposed a wire of spring tension or other spring biasing means for supporting portion 26 in biased relationship with bare portions of wires 12 in the manner illustrated with reference to Fig. 9.

With further reference to Fig. 9 and to Fig. 10 is shown a preferred form of lead wire assembly in which the bared portions 27 of insulated wires 12 are biased in contact with soft metal sleeve 21 by spring tension of spring tempered element 22 positioned to exert spring tension toward the inner wall 23' of sleeve 21 opposite inner wall 23, when the sleeve is closed. Spring 22 when bared portions 27 of wires 12 are disposed in the sleeve intermediate raised portion 26 and inner wall 23', biases wire portions 27 in contact with metal 21. Inner wall 23' is preferably an inner wall portion opposite wall 23 formed by an external indentation 25 on the sleeve 21, to press each wire portion 27 into still closer intermediate contact with metal 21 and strip portion 26. Each insulated portion 13 of wires 12 is supported rigidly in an end section 28 of sleeve 21 to further secure wires 12 in sleeve 21.

As particularly shown with reference to Fig. 10 each wall portion 23' is formed by an indent on sleeve 21 to place metal 21 in closer contact with a wire portion 27.

The indent 23' over each wire portion 27 is placed in closed sleeve 21 in any desired manner, or it can be omitted if desired.

A lead assembly of Figs. 7–10, now preferred, is preferably made by forming a partially open sleeve of a soft tempered metal 21, inserting a strip of spring metal 22 with section 26 raised toward the open side of sleeve 21, along an inner wall of the sleeve opposite its open side, and securing the strip therein; parting insulation on each of the two insulated wires 12 and pulling the insulation down on the wire to form a bared section 27; positioning the wires 12 longitudinally through sleeve 21 with portion 27 directly adjacent raised portion 26 of strip 21, and then crimping a wall section d tightly upon and around an adjacent section 27 of each wire and crimping end portions 28 upon and around adjacent insulated wire portions 13 to thereby secure each wire portion 27 in contact with metal 21 biased by spring strip 22.

Proper deformation of a metal of spring temper with a metal of soft temper and of relatively heavy gauge as described herein results in a constant spring pressure against the bared wire sections. This is advantageous over the shunts of the prior art inasmuch as such shunts are of one soft metal, and wire movements can easily loosen the grip of the shunt with concomitantly unsatisfactory contact of shunt with wire and consequent low resistance.

The exposed metallic shunt of this invention may be insulated such as by dipping, coating, spraying and the like before or after fabrication of the unit, to provide greater resistance of the shunt to entrance of extraneous currents.

It is an important advantage of this invention that when it is desired to remove the shunt, it is only necessary to pull the shunt along the wires in a direction away from the cap which will automatically strip off the insulation and expose a clean, uncorroded wire for attachment to the power source.

Firm contact of the shunt with the bare wire is achieved regardless of wire movement, for example, "wiggling" during handling. This is achieved by the coaction of the relatively heavy gauged soft metal as one component and a lighter or thinner springy metal as the other component, both pieces being so deformed against the wire that a good lock is maintained and yet the wire is not indented or marked as to cut through or break during handling.

When pulling down the insulation on the wires to expose a section of bare wire to which the shunt is to be applied, the end of the insulated wire can be squeezed to expand the tube insulation slightly to facilitate its removal. The insulation thus remaining on the wires acts to prevent corrosion from the atmosphere.

As will be evident to those skilled in the art, various modifications can be made or followed, in the light of the foregoing disclosure and discussion, without departing from the spirit or scope of the disclosure or from the scope of the claims.

What I claim and desire to protect by Letters Patent is:

1. In combination with an electric blasting cap a shunted lead wire assembly therefor comprising a pair of insulated conductor wires each containing a length which is uninsulated; first and second metal sheet members, each containing a curvilinear surface portion compatible with the other when spaced as described hereinafter, and one of said first and second sheets being of spring temper; said sheets being in spaced apart relation to form a passageway therebetween, and said curvilinear portion of each of said first and second sheets facing, and being substantially parallel with, the other, in said spaced apart relationship; said wire pair extending through said passageway, and each uninsulated wire length being contained entirely within said passageway and in direct contact with each of said curvilinear surface portions; and means supporting said first and second members in said spaced apart relation to exert spring tension on one of the said members against the said uninsulated wire lengths to bias same in said contact with the curvilinear surface portion of the other member.

2. In combination with an electric blasting cap a shunted lead wire assembly therefor comprising a pair of insulated conductor wires each containing a length which is uninsulated; a first metal sheet member, of spring temper, containing a curvilinear raised surface portion, and a second metal sheet member supported in spaced apart relationship with said first sheet, and facing said curvilinear surface portion, to form a passageway; said wire pair extending through said passageway, and each said uninsulated wire length being contained entirely within said passageway and in direct contact with the said curvilinear surface portion of said first sheet member, and with said second sheet member; and means supporting said first and second sheet members in said spaced apart relationship to exert spring tension of said first sheet member against each said uninsulated wire length to bias same in said contact with said second sheet member.

3. In combination with an electric blasting cap a shunted lead wire assembly therefor which comprises a pair of insulated conductor wires each containing a length which is entirely uninsulated; a first body member of spring temper containing a curvilinear raised surface portion, and a second body member supported opposite said first member in spaced apart relationship therewith, and facing said curvilinear surface, to form a passageway; said pair of wires extending through said passageway and each said uninsulated wire length being contained entirely within said passageway, and in direct contact with said raised surface portion of said first member and with said second member; and means supporting said first and second members in said spaced apart relationship so as to exert spring tension of said first member against said uninsulated wire lengths to bias same in contact with the said second member; and at least one of said first and second members being an electrical conductor.

4. An assembly of claim 3 wherein both said first and second members are metal and said second member is of temper softer and of gauge greater than that of said first member.

5. An assembly of claim 3 wherein the described structure combination of said first and second members is slidably movable along said wire pair toward the end of said wires opposite said cap, wherein each said wire is insulated intermediate the said uninsulated wire length and the said wire end, and wherein the last said insulation is slidably movable along said wire toward said wire end.

6. In combination with an electric blasting cap a shunted lead wire assembly therefor which comprises a pair of insulated wires each containing a length which is uninsulated; a metal sleeve, said pair of wires extending through said metal sleeve, and each said uninsulated wire length being entirely within said sleeve and in direct contact therewith; a metal strip, of spring temper, within said sleeve intermediate the said uninsulated wire lengths therein and a wall of said sleeve, and having a curvilinear raised surface extending along at least a portion of the length of said strip and facing, and in direct contact with, said uninsulated wire lengths; and means supporting said metal strip in said sleeve to exert spring tension against each of said uninsulated wire lengths to bias said wire lengths in contact with said sleeve.

7. An assembly of claim 6 wherein said sleeve is crimped on to said uninsulated wire lengths in a direction against the biasing force of said spring metal, thereby to facilitate biasing of said contact.

8. An assembly of claim 6 wherein said metal sleeve is of soft temper.

9. An assembly of claim 8 wherein said sleeve is crimped around said insulated wires on each side of the said uninsulated wire lengths.

10. An assembly of claim 8 wherein said metal sleeve is aluminum and said metal strip is Phosphor bronze.

11. A shunted lead wire assembly for an electric blasting cap which comprises a pair of insulated conductor wires each containing a length which is entirely uninsulated; a first body member of spring temper containing a curvilinear raised surface portion, and a second body member supported opposite said first member in spaced apart relationship therewith, and facing said curvilinear surface, to form a passageway; said pair of wires extending through said passageway and each uninsulated wire length being contained entirely within said passageway and in direct contact with said raised portion of said first member and with said second member; and means supporting said first and second members in said spaced apart relationship so as to exert spring tension of said first member against said uninsulated wire lengths to bias same in contact with the said second member; and at least one of said first and second members being an electrical conductor.

References Cited in the file of this patent

UNITED STATES PATENTS

| | | |
|---|---|---|
| 1,603,048 | Grant | Oct. 12, 1926 |
| 2,093,275 | Johnson | Sept. 14, 1937 |
| 2,523,782 | Sanda | Sept. 26, 1950 |
| 2,591,009 | Riche | Apr. 1, 1952 |
| 2,746,024 | Ostrak | May 15, 1956 |
| 2,768,363 | Haynes | Oct. 23, 1956 |